United States Patent [19]

Buckley

[11] Patent Number: 4,481,975
[45] Date of Patent: Nov. 13, 1984

[54] MULTI-SHEET CORRUGATED TANK CONSTRUCTION FOR PASSIVE SOLAR HEATING SYSTEMS

[75] Inventor: Bruce S. Buckley, San Jose, Calif.

[73] Assignee: B. Shawn Buckley, San Jose, Calif.

[21] Appl. No.: 391,837

[22] Filed: Jun. 24, 1982

[51] Int. Cl.³ .............................................. E03B 11/02
[52] U.S. Cl. .................................. 137/561 A; 126/434; 126/443; 126/449; 126/450; 220/5 A; 220/20; 220/441
[58] Field of Search ................ 126/434, 437, 443, 450, 126/426, 444, 448, 449; 165/166; 220/5 A, 20, 441; 137/561 A, 256, 259, 265, 564

[56] References Cited

U.S. PATENT DOCUMENTS 4,205,662 6/1980 Rhodes et al. ...................... 126/444
4,258,701 3/1981 Buckley ............................... 126/434
4,411,310 10/1983 Perry et al. ......................... 165/166

Primary Examiner—Martin P. Schwadron
Assistant Examiner—Mark Malkin
Attorney, Agent, or Firm—Burns, Doane, Swecker & Mathis

[57] ABSTRACT

A passive solar heating liquid storage tank is formed of multiple thin sheets of thermoplastic or thermoset material to provide a lightweight, inexpensive and high volume tank. The multiple sheets have a plurality of parallel undulations or corrugations transverse to their surfaces. The undulations form spacial wave trains of given amplitude and frequency so that when their peaks are secured together they form generally parallel circular tubes. One of the pair of sheets has a third sheet secured to its surface. The third also has undulations in its surface with spacial frequency at least as great as the frequency of the wave train of the pair of sheets. Peaks of the third sheet are then secured to exterior peaks of the pair of sheets. Such construction forms a tank having the strength of parallel cylindrical tubes but with total volume approaching that of tubes having a rectangular cross-section. In this way a lightweight tank with high volume and strength to resist structural beam flexure relative to the surfaces is formed. Such construction is particularly suitable for passive solar water heating installations at inaccessible locations over long periods of time, such as on the roof of a building.

9 Claims, 9 Drawing Figures

U.S. Patent Nov. 13, 1984 4,481,975
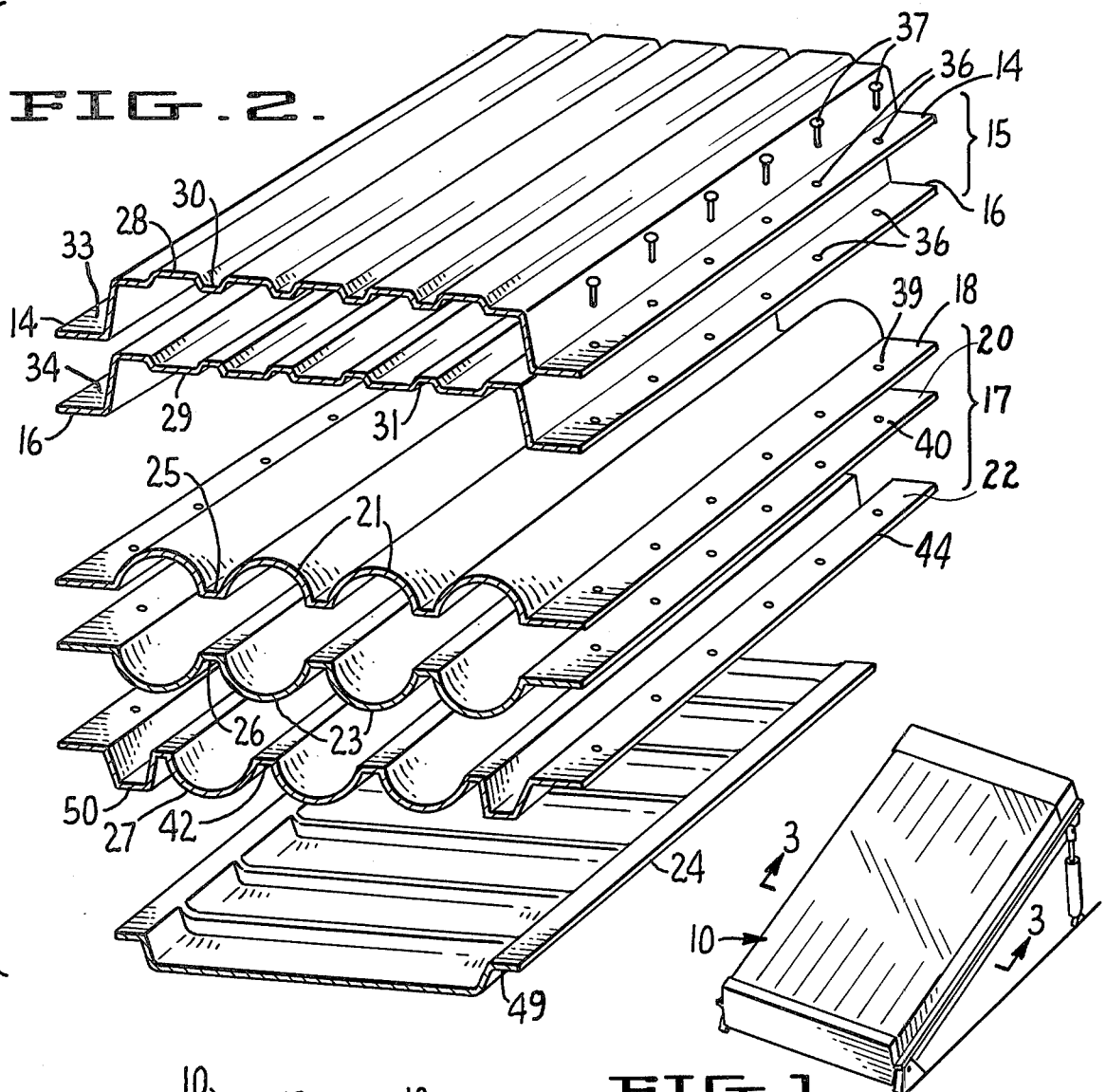
FIG. 2.
FIG. 1.
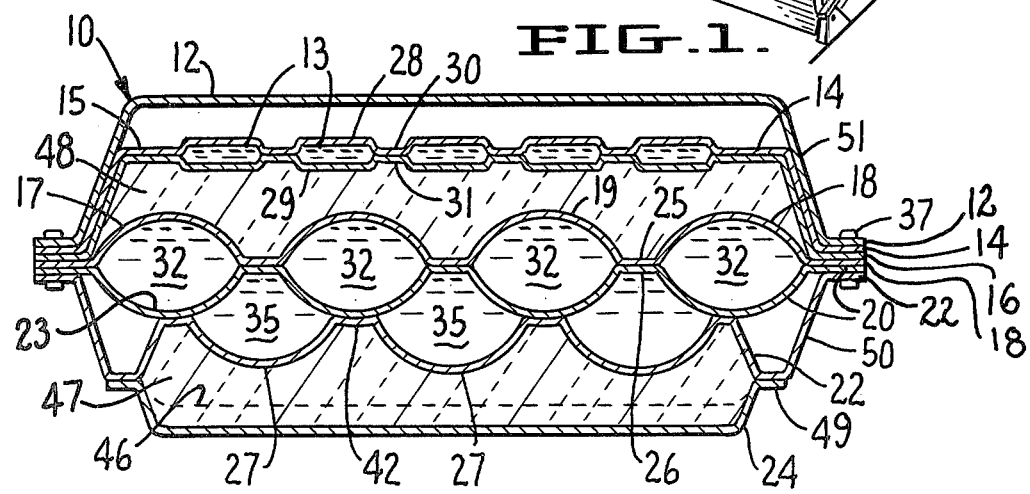
FIG. 3.

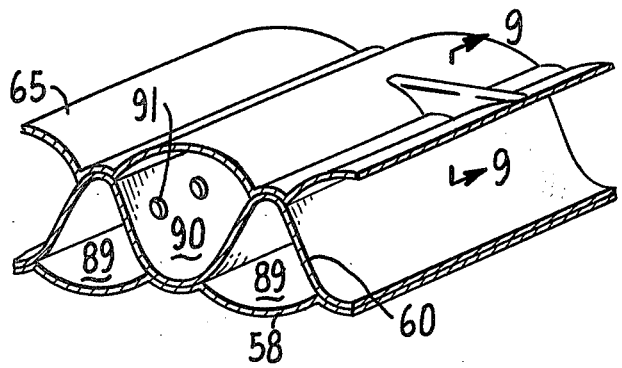
FIG. 8.
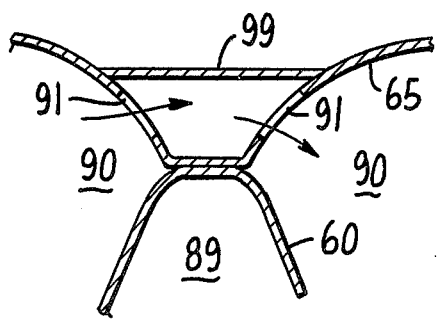
FIG. 9.
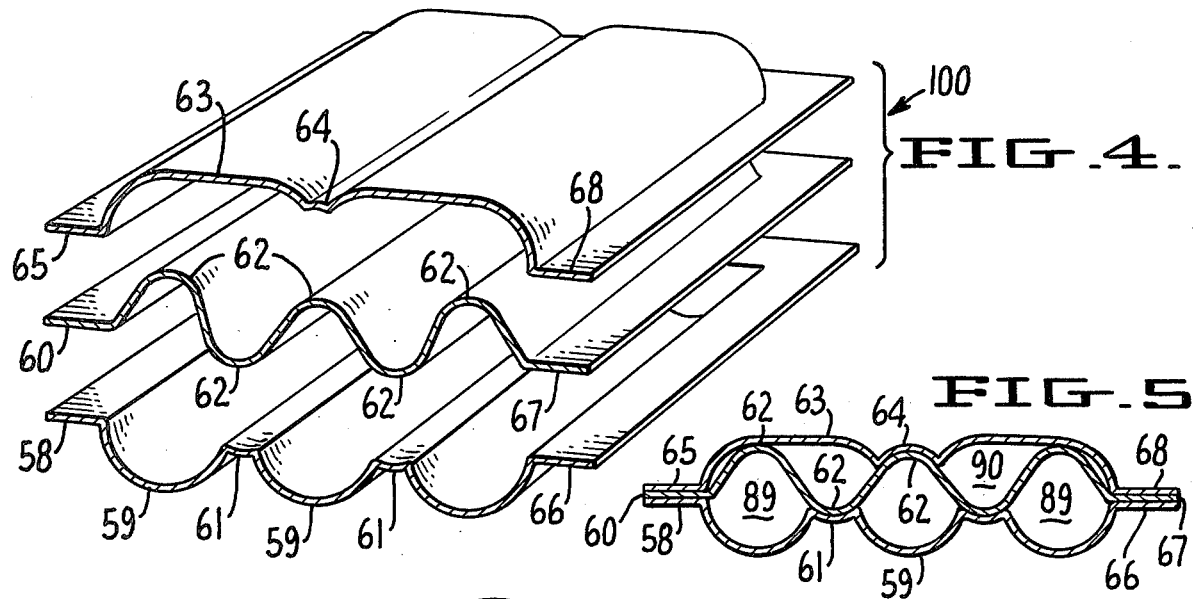
FIG. 4.
FIG. 5
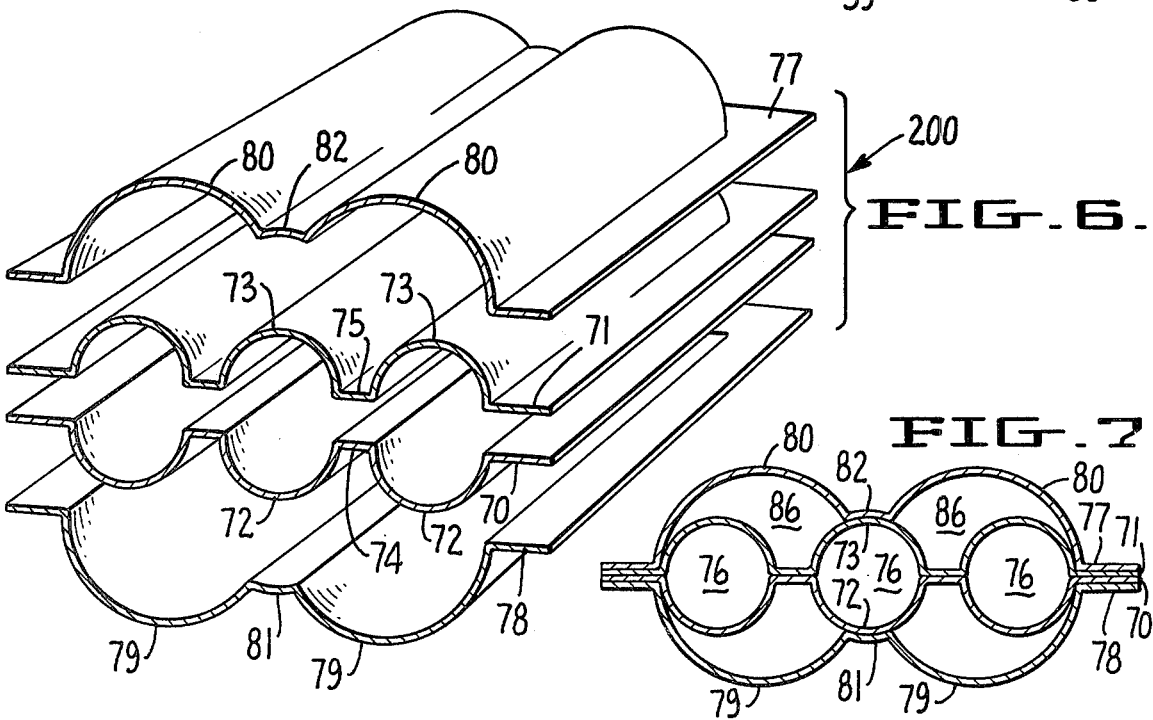
FIG. 6.
FIG. 7

MULTI-SHEET CORRUGATED TANK CONSTRUCTION FOR PASSIVE SOLAR HEATING SYSTEMS

FIELD OF THE INVENTION

The present invention relates to storage tanks for solar water heating systems. More particularly, it relates to constuction of such water storage tanks formed from multiple sheets of thin corrugated material.

It is a principal object of this invention to provide a water storage tank formed of thin sheets of thermoplastic or thermoset material which is lightweight and inexpensive to construct but with high volume to serve in a passive solar heating system as a hot water storage tank. In furtherance of this objective, the multiple sheets forming the tank are provided with a plurality of parallel undulations or corrugations transverse to their surfaces. The peaks and troughs of the undulations form a spacial wave train of given amplitude and frequency across the sheet so that the peaks of at least one sheet abut those of another sheet and when secured together they form generally parallel cylindrical tubes. One of the sheets has a third sheet secured to its surface. The third sheet also has undulations in its surface having a spacial frequency at least as great as the frequency of the wave train of the pair of sheets. One of the peaks of the third sheet is then secured to a peak on the exterior of the pair of sheets and the other peaks of the additional sheet are secured along areas parallel to the parallel cylindrical tubes. Such construction permits the formed tank to have the strength of parallel cylindrical tubes but with total volume approaching that of tubes having a rectangular cross-section. Thus a lightweight tank of high volume with structural beam strength and resistant to flexure relative to the surfaces is provided by such construction which is suitable for installation for long periods of time at inaccessible locations, such as on the roof of a building where a passive solar water heating system may be used.

BACKGROUND OF THE INVENTION

One of the major costs of solar water heating systems is the relatively large volume heated liquid storage tank which stores liquid heated by solar energy after circulation through a solar panel. While in general the stored liquid may be water, it is also frequently an alcohol, or ethylene glycol, and water mixture, or even a light oil. If the liquid is water it may be directly connected to a domestic water supply. Usually, however, the heated liquid is arranged to heat domestic water indirectly as by a heat exchange coil immersed in the stored liquid (so that potability of the liquid is not required).

Tanks for solar liquid storage have been constructed of copper, stainless steel, galvanized iron and plastic. The prime requirement for such a tank is a useful life of 10 to 20 years without maintenance. It must also be relatively lightweight for a passive solar water heating system. Such a system requires close proximity between the hot water storage tank and the solar absorber panel. The two units may be constructed either in a tank-over-panel configuration, or in a back-to-back arrangement as disclosed in my U.S. Pat. Nos. 4,137,964 issued Feb. 6, 1979, 4,245,617 issued Jan. 20, 1981 and 4,258,701 issued Mar. 31, 1981. In the latter system a one-way valve between the solar panel and the storage tank prevents back siphoning of heated liquid from the tank when liquid in the solar panel is cooler. In either case, the storage tank is placed on a roof, or other not easily accessible location, where the solar panel will receive maximum solar energy. Accordingly the weight loading of the unit on the roof is frequently critical. For this reason, the tank is desirably strong, lightweight and durable for a given liquid volume.

While in general a group of parallel pipe members, assembled with suitable headers, can be formed of plastic to form such a tank, having adequate flexural strength, the total liquid volume of the tank is low as compared to a tank with a generally rectangular cross-sectional area. On the other hand, such a rectangular tank is generally deficient in strength unless the walls are of adequate thickness or reinforced to withstand stresses applied by the hydrostatic pressure within the tank. Accordingly, there has been a need for a lightweight, inexpensive tank having adequate strength to volume ratio.

Tanks have also been constructed of two sheets of plastic in which multiple discrete areas between the sheets are secured together, but such tanks must be limited in volume to surface area unless the tank is externally supported.

Accordingly there is a pressing need for a tank having a large volume to surface area ratio which will be resistant to flexure.

SUMMARY OF THE INVENTION

In accordance with the invention a liquid storage tank suitable for storage of solar heated liquid is formed of multiple thin sheets of thermoplastic or thermoset plastic. Such sheets are either formed with undulations or corrugations either initially or by pressing or rolling the sheets to form parallel troughs and peaks. The troughs and peaks of at least two of the sheets are wave-like so that they form a wave train having a given amplitude and spacial frequency. This permits the two sheets to be bonded or secured together along parallel peak areas so that effectively a plurality of parallel tubes are formed. This tubular structure gives the so formed enclosed storage volume structural strength or stability.

Then, to increase the volume to strength ratio of the tank without sacrifice of weight to volume, at least a third sheet is similarly formed with undulations or corrugations so that when secured to one side of one of said pair of sheets it "fills" voids around the circumference of the tubes. For this purpose one of the peak areas of the third sheet is secured or bonded along one of the exterior peaks of one of the pair of sheets. Another peak areas of the third sheet is also secured or bonded along a parallel area that is laterally spaced from the first parallel area to span at least one trough on an exterior surface of the bonded pair of sheets.

Preferably the lateral spacing of the second parallel area will be greater than one full undulation or corrugation. The edges of the sheets parallel to the tubes are secured together to form stiffened edges. Still, another sheet, corresponding to the third sheet, may be secured to the other surface of the joined pair of sheets. The tank is desirably formed with headers at each end of the parallel tubes to permit common access to the interior of the tank. Inlet and outlet connectors are secured to, or preferably formed into, the headers. Alternatively, the ends of each parallel tube may be sealed and interconnecting passageways formed at spaced intervals along the length of the tubes by cross-holes or pipes. For additional stiffness of the tank, at least one sheet may include corrugations or undulations perpendicular to the parallel passageways or tubes. The latter sheet may also enclose insulation between it and the lower or outer sheet of the tank.

Further objects and advantages of the invention will become apparent from the following detailed description of the perferred embobiments and their method of construction, taken in conjunction with the accompanying drawings which form an integral part of the present specification.

BRIEF DESCRIPTION OF THE DRAWINGS

In the drawings:

FIG. 1 is a perspective view of a combined solar panel and hot liquid storage tank constructed in accordance with the present invention.

FIG. 2 is an exploded perspective view of a complete passive solar water heating system shown in FIG. 1 including both a solar panel and a hot liquid storage tank constructed in accordance with the present invention.

FIG. 3 is a vertical cross-sectional view of the assembled tank and panel sheets and a cover for the solar heating system shown in FIG. 1, taken in the direction of arrows 3—3.

FIG. 4 is an exploded perspective view of three sheets, each different in undulations, prior to assembly into a tank body in accordance with this invention.

FIG. 5 is a vertical cross-sectional view of the assembled sheets shown in FIG. 4.

FIG. 6 is an exploded perspective view of four sheets, including the pair of core sheets in FIG. 3, prior to assembly in a tank body.

FIG. 7 is a vertical cross-sectional view of the assembled sheets shown in FIG. 6.

FIG. 8 is a partial perspective view of the liquid storage tank shown in FIG. 5 showing liquid passageways formed between parallel cylinders by axially spaced holes.

FIG. 9 is a cross-sectional view in the direction of arrows 9—9 in FIG. 8 illustrating tubes forming passageways between the cylinders.

DETAILED DESCRIPTION OF PREFERRED EMBODIMENTS OF THE INVENTION

FIG. 1 illustrates a passive solar water heating system constructed with both a solar heating panel and the solar liquid storage tank formed of multiple sheets in accordance with the present invention. In the present embodiment, solar panel and liquid storage tank are arranged in back-to-back form in accordance with the disclosure of my prior issued patents, above noted. As indicated generally in the arrangement of FIG. 1, and best seen in FIGS. 2 and 3 box 10 is constructed of a plurality of preformed sheets indicated generally in FIG. 2 as sheets 12, 14, 16, 18, 20, 22 and 24. Each of the sheets 12 through 24 are desirably thin thermoplastic or thermoset material which may either be molded from a flat sheet of material into the desired configuration or formed by a simultaneous spray coating and vacuum set in an open mold. For example, fiberglass fibers embedded in epoxy may be sprayed or laid into an open mold and vacuum formed by applying a flexible, impermeable cover sheet over the mold and then evacuating the air from between the mold and the cover sheet. Alternatively, the sheets may be formed by a positive pressure on one side of the cover sheet and a negative or lower pressure between the mold and cover sheet. Often a perforated sheet is added between mold and cover sheet to insure uniform pressure distribution on the sheet being formed. Thus the material will take form as defined by the mold.

Individual sheets 14 and 16, forming the composite solar panel 15 and sheets 18, 20, and 22 forming solar-heated liquid tank 17 are shown in the exploded view in FIG. 2, which particularly illustrates the sheet configurations used in the arrangement of FIGS. 1 and 3. Top cover sheet 12 is not shown in FIG. 2 since it is a glazing cover to reduce heat-loss from the exposed surface of solar panel 15. Sheet 12 is desirably formed of a clear transparent material and is used primarily to transmit solar energy while preventing heat loss from sheet 14. As will be noted in the cross-sectional view of FIG. 3 it is desirable that solar heating panel 15 which is formed by sheets 14 and 16 provide a plurality of relatively thin, broad liquid channels in parallel which permit fluid in such channels to be heated by solar energy. The outer surface of sheet 14 is painted or coated with a black paint or other high absorptivity coating to improve its ability to absorb solar energy. By solar heating in panel 15, liquid is siphoned from the bottom of liquid storage tank 17 formed by sheets 18, 20, and 22. Heated fluid is returned from solar panel 15 to the top of storage tank 17 through a one-way valve (not shown). The purpose of this valve is discussed in my issued patents as above noted. Briefly, its purpose is to prevent back-siphoning of heated fluid in tank 17 to panel 15 at night or in cold, cloudy weather when liquid in panel 15 may be colder than that in tank 17. It is also to be noted that the thin, broad liquid channels 13 formed by sheets 14 and 16 have headers or interconnecting passages (not shown) to allow liquid from one channel 13 to flow into another channel 13.

As indicated above, it is particularly desirable that the assembly formed by the multi-sheets of corrugated material be strong and light-weight for the volume of liquid. Hence, if solar panel 15 or tank 17, or both, must be supported in a location generally inaccessable, and where little or no maintenance is contemplated or available, and the units are exposed with limited physical support, a satisfactory installation is possible. Primarily the weight of the installed assembly is due to the quantity of liquid which must be supported with limited bracing or foundation. Necessarily this volume is made as large as possible for an efficient system. Accordingly, it is primarily tank 17 in which the method of construction of the present invention is most useful. However, ease of construction of a panel, such as 15, is also essential for low cost and for this reason the solar panel is also desirably formed in the same manner except that the volume of the individual tubes such as 13 are broad and flat as shown in FIG. 3. In this form, corrugation or wave-like undulations 28 and 29 in sheets 14 and 16 respectively are mirror images of each other; peaks 30 and 31 respectively abut each other and are bonded together to form parallel tubes 13.

The edges of sheets 14 and 16 may be formed with parallel flanges 33 and 34 respectively which may be secured together as mounting or support means for panel 15. As indicated a plurality of screw or rivet holes 36 may be formed in the edges of flanges 33 and 34 to receive fasteners 37.

As indicated above, storage tank 17 is formed of at least three plastic sheets indicated as 18, 20 and 22. Sheets 18 and 20 have complementary undulations or wave-like corrugations that form a plurality of parallel tubes 19 when abutting parallel peak areas 25 and 26 are bonded together. In general, tubes 19 can communicate with each other; (either through headers or through cross passages spaced occasionally along the bands 25); the only "sealing" as between sheets 18, 20 and 22 is along the edges 39, 40 and 44.

As indicated the spacial frequencies of undulations 21 and 23 are equal so that sheets 18 and 20 may be formed in a single mold or casting form. Edges 39 and 40 of sheets 18 and 20 are also formed so that when pinned or sealed together they also provide stiff mounting or support means for tank 17. Sheet 22 is formed as in FIGS. 2 and 3 so that the spacial frequency of undulations or corrugations 27 are at least 90 degrees out of phase and have a wave length peak-to-peak at least as great as that of undulations 23 in sheet 20. As shown in FIG. 3, peak areas 42 of sheet 22 are bonded to the peak area formed by undulations 23 of sheet 20. As will be clear from the drawings such structure forms parallel tubes 32 between sheets 18 and 20 and tubes 35 between sheets 20 and 22. Such tubes together have the strength of cylinders of generally a circular cross-sectional area but the composite volumes produce a container of generally rectangular cross-sectional area. Sheet 22 also has parallel edges defining, flanges 44 which may be secured to flanges, 39 and 40 of sheets 18 and 20 respectively.

For additional strength of solar heating assembly 10, sheet 24 may be formed with corrugations 46, perpendicular to the corrugations in sheets 18, 20 and 22. Further, sheet 24 acts as cover sheet to hold insulation 47 against the outer surface of sheet 22. Insulation 47 may be a glass fiber batting or foamed plastic. In the same way insulation 48 is enclosed between solar panel 15 and tank 17. Sheet 24 also includes parallel mounting flanges, 49 which may be sealed to the flat-bottomed V-flange 50 of sheet 22. Alternatively, it might also be provided with a longer flange so that it could be pinned as by rivets or other fasteners 37 to the flanges of the other multiple sheets. Such construction would be similar to flange 51 on cover sheet 12.

FIGS. 4 and 5 illustrate an alternate embodiment of a hot liquid storage tank constructed in accordance with the present invention. As indicated by the three sheets shown in an exploded view in FIG. 4, the undulations or corrugations form a sinusoidal wave train in sheets 58 and 60 which have essentially the same spacial frequency, but the wave shapes are different. In sheet 58 the wave form is essentially a series of half waves 59 with a flat peak 61 between each half wave. Sheet 60 on the other hand is a full wave, or oscillation, in form in which peaks 62 coincide spacially with peaks 61. The parallel sealed areas of sheets 58 and 60 is best seen in FIG. 5. Third sheet 65 which provides additional storage capacity of the tank in a given volume includes undulations 63 of double the wave length of the waves in sheets 58 and 60. As indicated, a center area 64 is sealed to one of the outward-going peaks 62 of sheet 60. Each of sheets 58, 60 and 65 include edge areas 66, 67 and 68, respectively, for forming a stiff mounting support for the resultant tank.

FIGS. 8 and 9 illustrate alternate arrangements without using headers for interconnecting parallel tubes, such as volumes, 89 and 90 in FIG. 5. In FIG. 8, holes 91 in sheet 60 form passages to permit full mixing of liquid throughout the storage tank. In FIG. 9, tubes 99 are transverse to the parallel cylinders, or tubes 89 and 90, formed by sheets 60 and 65. As shown they connect holes 91 in sheet 65 across sealed peaks 63 and 64.

FIGS. 6 and 7 show a further modification of the present invention. As there shown, center sheets 70 and 71 are both formed with half circular undulations 72 and 73 with flat sections 74 and 75 therebetween. In an assembled form as in FIG. 7, parallel circular pipes 76 are thus formed for maximum strength of the tank. The "filling factor" for the exterior of such pipes within a generally rectangular tank is then provided by outer sheets 77 and 78 which have undulations 79 and 80, respectively, whose spacial wave lengths are double that of pipes 76. As indicated in FIG. 7, the resultant outer shell of tank 200 comprises two larger diameter circular pipes 80 enclosing pipes 76. Areas 81 and 82 in sheets 77 and 78 between waves 79 and 80, respectively, are secured to peaks 72 and 73 of sheets 70 and 71. In the same way, sheets 70, 71, 77 and 78 include side edges with flange areas that are secured together to form stiff support means for the tank.

While only a few embodiments of the invention have been shown and described it will become apparent to those skilled in the art that various modifications and changes can be made in the method of forming and the resulting tank without departing from the invention. All such modifications or changes coming within the scope of the appended claims are intended to be covered thereby.

I claim:

1. A liquid storage tank or the like formed of a plurality of thin sheets of formable material, the surface of each of said sheets of said plurality being formed with a plurality of undulations, the peaks and troughs of said undulations extending parallel with each other, said undulations being generally wave-like in configuration to form a wave train and said sheets being secured together so that at least the peak area of one sheet abuts a corresponding parallel peak area in another of said sheets and an additional sheet includes undulations having a spacial frequency at least as great as said wave train with a peak of at least one said undulation of said additional sheet bonded along the extension of at least one of said wave train peaks and another portion of said additional sheet bonded along an area parallel thereto spaced at least as far apart as the next peak in the wave train of the two abutting sheets, said sheets being joined together along at least their two side edges parallel to said undulations and the end edges of said sheets being enclosed to form said tank, and passageways formed in a surface of said sheets forming said undulations for communication of liquid therethrough.

2. The tank of claim 1 in which each of said sheets has one pair of edges secured to similar edges of each of the other of said plurality of sheets to form parallel multi-layered stiffened edges along parallel sides of said storage tank.

3. A tank in accordance with claim 1 having openings formed in an outer wall of said tank for inlet and outlet of liquid flowing through the included volumes between said bonded areas.

4. A liquid storage tank in accordance with claim 1 in which said interconnecting passageways are perpendicular to said parallel troughs to connect isolated interval volumes within said tank formed by said sheet undulations.

5. A liquid storage tank in accordance with claim 1 in which said passageways are holes in said sheets to connect isolated internal volumes within said tank formed by said undulations.

6. The tank of claim 1 in which at least one other sheet includes corrugations perpendicular to said wave train undulations.

7. The tank of claim 6 wherein at least three sheets are formed together and the undulations in each sheet has a sinusoidal wave-train form in which a maximum volume between said sheets is formed by the wave maxima of the train of waves of one sheet being in phase with the wave maxima of a train of waves in another sheet, and the wave maxima of the train of waves of the third sheet is in phase with the maxima of the wave train of said one or said other sheet.

8. A tank in accordance with claim 7 in which said other parallel area for bonding said third sheet to one of said two sheets overlies an adjacent one of said spaced apart parallel areas.

9. A tank in accordance with claim 7 in which said sheets are bonded together along their edges parellel to said spaced apart parallel areas to form multi-layered stiffened members for two edges of said tank.

* * * * *